United States Patent
Piggin et al.

(10) Patent No.: US 9,456,435 B2
(45) Date of Patent: Sep. 27, 2016

(54) COMMUNICATION UNITS AND METHODS FOR CONTROL CHANNEL CHANGE NOTIFICATION IN BROADCAST COMMUNICATION SYSTEM SUPPORTING CARRIER AGGREGATION

(75) Inventors: Paul Piggin, Wiltshire (GB); Peter Darwood, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 596 days.

(21) Appl. No.: 14/000,282

(22) PCT Filed: Feb. 17, 2012

(86) PCT No.: PCT/GB2012/050368
§ 371 (c)(1),
(2), (4) Date: Oct. 14, 2013

(87) PCT Pub. No.: WO2012/110831
PCT Pub. Date: Aug. 23, 2012

(65) Prior Publication Data
US 2014/0050139 A1 Feb. 20, 2014

(30) Foreign Application Priority Data
Feb. 18, 2011 (GB) .................... 1102892.5

(51) Int. Cl.
*H04W 72/00* (2009.01)
*H04L 5/00* (2006.01)
*H04W 48/12* (2009.01)
*H04W 72/04* (2009.01)

(52) U.S. Cl.
CPC .......... *H04W 72/005* (2013.01); *H04L 5/0096* (2013.01); *H04L 5/001* (2013.01); *H04L 5/0053* (2013.01); *H04W 48/12* (2013.01); *H04W 72/042* (2013.01)

(58) Field of Classification Search
None
See application file for complete search history.

(56) References Cited

U.S. PATENT DOCUMENTS

2011/0038296 A1    2/2011   Yi et al.

FOREIGN PATENT DOCUMENTS

| CN | 101257649 A | 9/2008 |
| CN | 101742410 A | 6/2010 |

(Continued)

OTHER PUBLICATIONS

Combined Chinese Office Action and Search Report issued Jan. 15, 2016 in Patent Application No. 201280007402.3 (with English translation of categories of cited documents).

(Continued)

*Primary Examiner* — Afshawn Towfighi
(74) *Attorney, Agent, or Firm* — Oblon, McClelland, Maier & Neustadt, L.L.P (57) ABSTRACT

A method supporting control channel change notification for at least one wireless communication unit capable of operating on a first serving communication cell and configured with access to at least one second serving communication cell in a wireless broadcast communication system. The method includes, at a broadcast server: supporting communication with at least one wireless communication unit via the at least one second serving communication cell; generating a message including an indication that a control channel change notification will be sent in the at least one first serving communication cell; transmitting the message to the at least one wireless communication unit operational in the at least one second serving communication cell; and transmitting the control channel change notification in the first serving communication cell.

30 Claims, 6 Drawing Sheets (56) References Cited

FOREIGN PATENT DOCUMENTS

| CN | 101800942 A | 8/2010 |
|---|---|---|
| WO | 2011 020027 | 2/2011 |
| WO | 2011 097930 | 8/2011 |

OTHER PUBLICATIONS

3GPP TSG RAN WG1 Meeting #62bis R1-105687, "On the support for eMBMS in Carrier Aggregation", IPWireless Inc., Total 3 pages, (Oct. 11-15, 2010).

3GPP TS 36.300 V10.0.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN), Total 183 Pages, (Jun. 17, 2010).

3GPP TSG-RAN WG1 #61 R1-102891, "Remaining issues on carrier indicator field", ZTE, Total 3 pages, (May 10-14, 2010).

3GPP TSG RAN WG2 #68 R2-096662, "Changing SIB13", Huawei, Total 4 pages, (Nov. 9-13, 2009).

British Search Report Issued Jun. 16, 2011 in Application No. GB1102892.5 Filed Feb. 18, 2011.

International Search Report Issued Apr. 10, 2012 in PCT/GB12/050368 Filed Feb. 17, 2012.

COMMUNICATION UNITS AND METHODS FOR CONTROL CHANNEL CHANGE NOTIFICATION IN BROADCAST COMMUNICATION SYSTEM SUPPORTING CARRIER AGGREGATION

CROSS-REFERENCE TO RELATED APPLICATIONS

The present application claims priority to British patent application 1102892.5 filed in the UK on Feb. 18, 2011, the entire contents of which are incorporated herein by reference.

FIELD OF THE INVENTION

The invention relates to communication units and methods for control channel change notification in broadcast communication. In particular, but not exclusively, the field of the invention relates to cross-carrier control channel change notification in a Long Term Evolution (LTE) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users. An example of communication systems using these principles is the Universal Mobile Telecommunication System (UMTS™).

In order to provide enhanced communication services, the LTE version of 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth. The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network. Further description of LTE, can be found in Sesia, Toufik, Baker: 'LTE—The UMTS™ Long Term Evolution; From Theory to Practice', page 11. Wiley, 2009.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions. Thus, technologies for delivering multimedia broadcast services over cellular systems, such as the evolved Mobile Broadcast and Multicast Service (eMBMS) for the LTE aspect of E-UTRA, have been specified over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in a presence of additional, potentially interfering broadcast signals, transmitted on the non-overlapping physical resources of adjacent cells.

To improve spectral efficiency, broadcast solutions have also been developed for cellular systems in which the same broadcast signal is transmitted by multiple cells but using the same (i.e. overlapping) physical resources. In these systems, cells do not cause interference to each other as the transmissions are arranged to be substantially time-coincident, and, hence, capacity is improved for broadcast services. Such systems are sometimes referred to as 'Single Frequency Networks', or 'SFNs'. In SFN systems, a common cell identifier (ID) is used to indicate those (common) cells that are to broadcast the same content at the same time. In the context of the present description, the term 'common cell identifier' encompasses any mechanism for specifying SFN operation, which may in some examples encompass a use of, say, a single scrambling code.

The LTE eMBMS feature was introduced to the 3GPP™ standard specifications in Release 9. When enabled, a wireless subscriber unit (referred to as user equipment (UE) in 3GPP™ parlance) is informed as to those subframes that have been allocated to eMBMS transmissions. The MBMS control channel (MCCH) and the MBMS traffic channel (MTCH) are multiplexed together in these subframes. The MCCH can change on a periodic basis, known as the MCCH modification period. In order to provide an efficient mechanism to notify UEs of upcoming changes to the MCCH, an MCCH change notification is transmitted in the modification period prior to the MCCH change. Thus, UEs are able to determine in advance that the MCCH information will have changed from the MCCH modification period boundary.

A MCCH change notification is contained in a physical downlink control channel (PDCCH) transmission located in an MBMS subframe. The PDCCH is located in the common search space of the PDCCH transmission space. A downlink control information (DCI) Format 1C of 8 bits is firstly padded, then acyclic redundancy check (CRC) is added, before it is convolutionally encoded and mapped to the PDCCH. In order to distinguish this DCI from other DCI mapped to the PDCCH common search space, the CRC is scrambled by the unique MBMS radio network temporary identifier (M-RNTI).

Carrier Aggregation (CA) was introduced in Rel.10 of the 3GPP™ standards. CA supports the aggregation of two or more component carriers (CC), up to a total of five CCs, which advantageously provide wider transmission bandwidths of, say, up to 100 MHz, for some UEs to utilise. CA allows a UE to simultaneously receive one or multiple component carriers, depending on the UE's capabilities. A UE that is capable of the aggregation of multiple component carriers can be configured to be cross-carrier scheduled, e.g. the allocation information for resources on one component carrier is transported on a different component carrier. It is also possible to aggregate a different number of component carriers of possibly different bandwidths in the uplink (UL) and the downlink (DL) channels. In typical TDD deployments, the number of component carriers and the bandwidth of each component carrier in UL and DL will be the same.

However, when a UE is not cross-carrier scheduled, then the UE is configured to read the component carrier (CC) physical downlink control channel (PDCCH) on each serving-cell in order to determine whether or not a resource allocation is present on that component carrier. If a UE is cross-carrier scheduled, a carrier indicator field (CIF) can be semi-statically configured to enable cross-carrier UL and DL assignment of frequencies for use, for example using the PDCCH in a first component carrier (CC1) to allocate a physical downlink shared channel (PDSCH) resource in a second component carrier (CC2).

When operating in an aggregated carrier mode, each UE is configured with one or more serving cells. Among these serving cells, one is designated the primary cell (Pcell) and any others are designated as secondary cells (Scells). The Pcell designation is UE-specific and certain attributes are associated with the Pcell. Each serving-cell is designed to be Release 8/9 backwards compatible.

However, the Release 10 of the 3GPP™ standard specification does not support CIF in the DCI Format 1C, as used in Release 9 eMBMS. Furthermore, eMBMS has not been discussed as part of Release 10 of the 3GPP™ standard. Thus, no solution to supporting cross-carrier scheduling of eMBMS signalling exists, particularly in a case where a UE desiring eMBMS content is capable of carrier aggregation. In particular, there is no current technique to provide cross carrier indication of a MCCH change notification for LTE CA, for a situation where a UE is not operating on the Pcell but is operating on at least one Scell. In addition, within Release 10 of the 3GPP™ standard, a UE is not expected to decode the common search space on a secondary cell (Scell). Hence, amongst other factors, the LTE specification is silent on providing for MBMS control channel change notification on any carrier other than the primary carrier/cell (Pcell) (as defined for Release 9).

Consequently, current techniques are suboptimal. In particular, there is no current technique to provide cross carrier indication of a MCCH change notification for LTE CA, for a situation where a UE is not operating on the primary serving communication cell but is operating on at least one second serving communication cell. Hence, a provision of such a solution would be advantageous.

SUMMARY OF THE INVENTION

Various aspects and features of the present invention are defined in the claims.

Embodiments of the invention seek to mitigate, alleviate or eliminate one or more of the abovementioned disadvantages singly or in any combination.

According to a first aspect of the invention, a method for supporting control channel change notification for at least one wireless communication unit that is capable of operating on both a first serving communication cell and has been configured with access to at least one second serving communication cell in a wireless broadcast communication system is described. The method comprises, at a network element: supporting communication with the at least one wireless communication unit via the at least one second serving communication cell; generating a message comprising an indication that a control channel change notification will be sent in the at least one first serving communication cell; transmitting the message to the at least one wireless communication unit operational in the at least one second serving communication cell; and transmitting the control channel change notification in the first serving communication cell.

In this manner, cross carrier indication of a MCCH change notification for LTE CA may be achieved, particularly for a situation where a UE is not operating on the primary serving communication cell but is operating on at least one second serving communication cell.

In one optional example, supporting communication with the at least one wireless communication unit via the at least one second serving communication cell may comprise supporting communication with the at least one wireless communication unit via only the at least one second serving communication cell.

In one optional example, transmitting the message to the at least one wireless communication unit operational in the at least one second serving communication cell may comprise transmitting the message in a common search space across a plurality of second serving communication cells via a base station.

In one optional example, generating a message comprising the indication that a control channel change notification will be sent in the at least one first serving communication cell may comprise setting a payload of data to substantially all zeros.

In one optional example, generating a message comprising the indication may comprise setting a payload of data to substantially all zeros and first scrambling a cyclic redundancy check (CRC) of the payload with a broadcast identifier.

In one optional example, the message may be generated in a DCI format 1C message, wherein the method may further comprise first scrambling the DCI format 1C message CRC with the broadcast service identifier.

In one optional example, first scrambling the DCI format 1C message CRC with the broadcast service identifier may comprise first scrambling a coded DCI format 1C message CRC with a multicast broadcast multimedia service (MBMS) radio network temporary identifier (M-RNTI).

In one optional example, the message may be generated in a DCI format 1C message and the method further comprises first scrambling a coded DCI format 1C message with a scrambling code comprising a cell-specific or common cell identifier.

In one optional example, generating a message may comprise allocating the indication to a portion of a frame or a subframe dedicated to at least one control channel or dedicated to at least one indicator channel. In one example, allocating the indication to a portion of a frame or a subframe dedicated to at least one control channel or dedicated to at least one indicator channel comprises allocating a cell-specific identifier to second scramble the indicator that indicates that the control channel change notification will be sent in the at least one first serving communication cell.

In one optional example, transmitting the message in the at least one second serving communication cell may comprise transmitting the message in each of the at least one second serving communication cell and the at least one first serving communication cell.

In one optional example, transmitting the control channel change notification in the first serving communication cell may comprise transmitting the control channel change notification on a single carrier frequency in the first serving communication cell.

In one optional example, the message may identify a control channel change of a multicast broadcast multimedia service (MBMS) Control Channel (MCCH) associated with the at least one wireless communication unit.

In one optional example, the network element may comprise at least one from a group consisting of: a broadcast server, channel structure logic located within a broadcast server a multicast broadcast multimedia service (MBMS) co-ordination entity (MCE).

In one optional example, the wireless broadcast communication system may support a long term evolved (LTE) multicast broadcast multimedia service.

According to a second aspect of the invention, there is provided a non-transitory computer program product comprising executable program code for supporting control channel change notification for a wireless communication unit that is capable of operating on both a first serving communication cell and has been configured with access to at least one second serving communication cell in a wireless broadcast communication system, substantially in accordance with the first aspect.

According to a third aspect of the invention, there is provided a network element for supporting control channel change notification for a wireless communication unit that is capable of operating on both a first serving communication cell and has been configured with access to at least one second serving communication cell in a wireless broadcast communication system. The network element comprises: signal processing logic arranged to: support communication with at least one wireless communication unit via the at least one second serving communication cell; and generate a message comprising an indication that a control channel change notification will be sent in the at least one first serving communication cell. The network element further comprises a transmitter arranged to: transmit the message to the at least one wireless communication unit operational in the at least one second serving communication cell; and transmit the control channel change notification in the first serving communication cell.

In one optional example, the network element may comprise at least one from a group consisting of: a broadcast server, channel structure logic located within a broadcast server a multicast broadcast multimedia service (MBMS) co-ordination entity (MCE).

According to a fourth aspect of the invention, there is provided an integrated circuit for a base station comprising signal processing logic substantially in accordance with the third aspect.

According to a fifth aspect of the invention, there is provided a method for supporting control channel change notification for a wireless communication unit that is capable of operating on both a first serving communication cell and has been configured with access to at least one second serving communication cell in a wireless broadcast communication system. The method comprises, at the wireless communication unit: receiving communication via the at least one second serving communication cell; receiving and decoding a message via the at least one second serving communication cell wherein the message comprises an indication that a control channel change notification is to be sent in the at least one first serving communication cell; and receiving the control channel change notification in the first serving communication cell.

According to a sixth aspect of the invention, there is provided a non-transitory computer program product comprising executable program code for supporting control channel change notification for a wireless communication unit that is capable of operating on both a first serving communication cell and has been configured with access to at least one second serving communication cell in a wireless broadcast communication system, substantially in accordance with the fifth aspect.

According to a seventh aspect of the invention, there is provided a wireless communication unit for supporting control channel change notification for a wireless communication unit that is capable of operating on both a first serving communication cell and has been configured with access to at least one second serving communication cell in a wireless broadcast communication system. The wireless communication unit comprises signal processing logic operably coupled to a receiver and arranged to: receive communication via the at least one second serving communication cell; receive and decode a message comprising an indication that a control channel change notification is to be sent in the at least one first serving communication cell; and receive the control channel change notification in the at least one first serving communication cell.

According to an eighth aspect of the invention, there is provided an integrated circuit for a wireless communication unit comprising signal processing logic substantially in accordance with the seventh aspect.

According to a ninth aspect of the invention, there is provided a broadcast wireless communication system comprising a base station in accordance with the third aspect and a wireless communication unit in accordance with the seventh aspect.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a Long Term Evolution (LTE) cellular communication system and, in particular, to an LTE Radio Access Network (RAN) operating in any paired or unpaired spectrum within a 3$^{rd}$ generation partnership project (3GPP™) system. However, it will be appreciated that the invention is not limited to this particular cellular communication system, but may be applied to any cellular communication system supporting broadcast communication. The following description also focuses on embodiments of the invention applicable to providing broadcast (e.g. uni-directional) services on an LTE cellular communication system, for example one supporting an evolved Mobile Broadcast and Multicast Service (eMBMS). eMBMS is a broadcasting and multicasting service offered over mobile telecommunications networks, such as the Evolved Packet System (EPS), and the like. The technical specifications for eMBMS include 3GPP™ TS 36.300.

Example embodiments described herein may be applied, for example, to provide full flexibility in cross carrier indication of MCCH change notification, for example in a scenario whereby eMBMS data is transported over an LTE communication system and particularly for a situation where a UE is not operating on the primary cell (Pcell) but is operating on at least one secondary cell (Scell). In the examples, a skilled artisan will appreciate that the term component carrier (CC), in a context of a communication channel, may be considered in some instances as synonymous with the term serving-cell, in supporting communications to UEs residing in a geographical area, and the terms may be used interchangeably, hereinafter.

Figure 1:
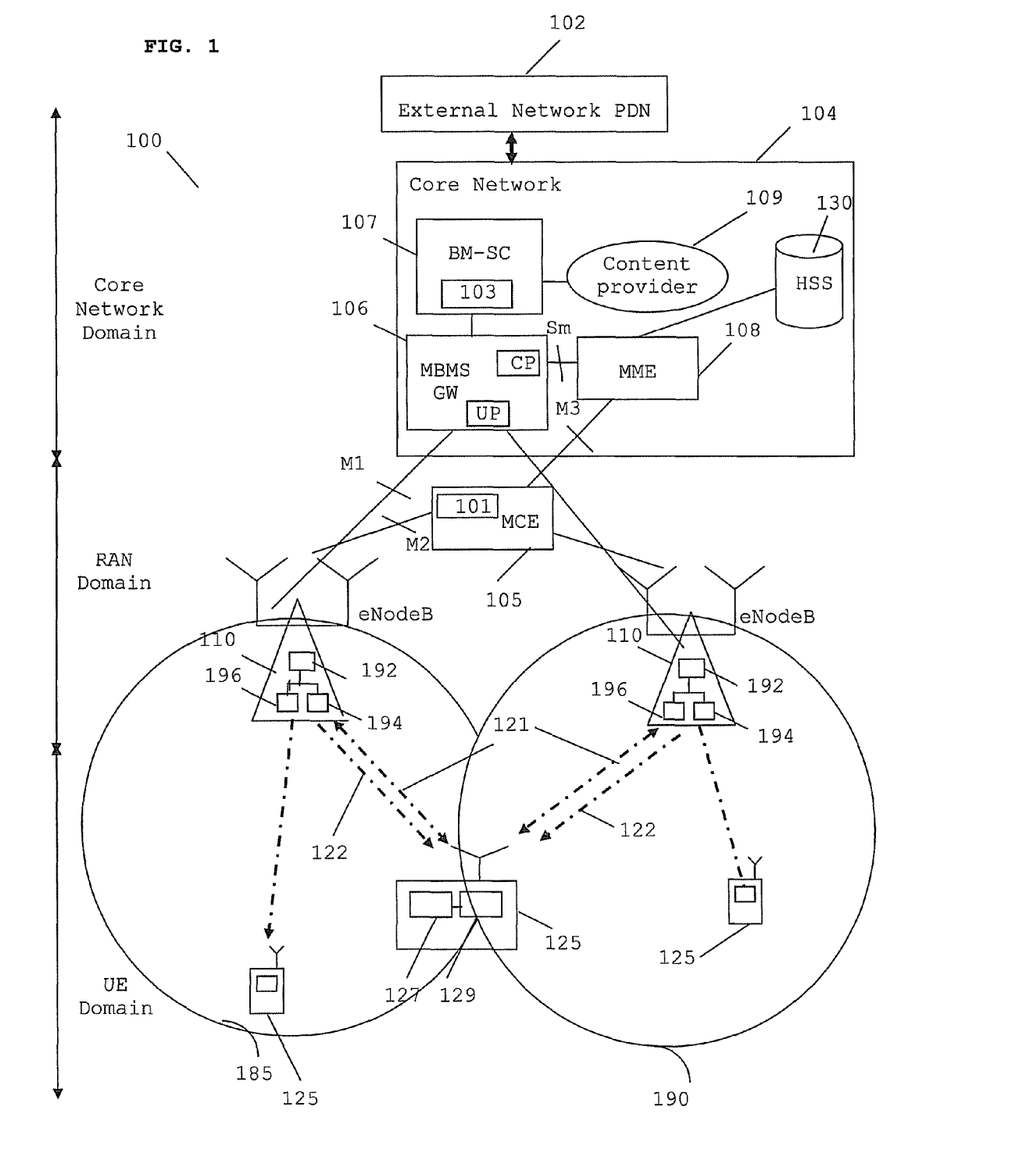
FIG. 1 illustrates a 3GPP™ LTE cellular communication system in accordance with some example embodiments of the present invention.

Referring now to FIG. 1, a wireless communication system 100 is shown in outline, in accordance with one example embodiment of the invention. In this example embodiment, the wireless communication system 100 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined. In particular, the example embodiment of the LTE system may be adapted to support broadcast E-UTRAN communication in one or more communication cells.

The wireless communication system 100 architecture consists of radio access network (RAN) and core network (CN) elements, with the core network 104 being coupled to external networks 102 (named Packet Data Networks (PDNs)), such as the Internet or a corporate network. The CN 104 comprises a broadcast media service centre (BM-SC) 107 that, in one example, is coupled to, in order to receive broadcast content, a content provider 109.

In example embodiments, a plurality of eMBMS carriers (both primary and secondary) is aggregated by a network element within the CN 104, such as channel structure logic 103 located within the BM-SC 107. In alternative examples, the plurality of eMBMS carriers (both primary and secondary) is aggregated by a network element within the RAN 104, such as signal processing logic 101 residing in MBMS co-ordination entity (MCE) 105 or the eNodeB 110. For simplicity, and in accordance with the examples hereinafter described, the network element will be described in terms of a CN element.

A broadcast indicator, for example an MBMS indicator channel (MICH) is physically added by the supporting eNodeB 110, and where, in some examples, the co-ordination of the broadcast indicator or MICH is performed by the signal processing logic 101 of the MCE 105 or the channel structure logic 103 located within the BM-SC 107, on each component carrier (CC) of the one or more broadcast serving communication cells. In this manner, the MICH identifies across all supported CCs that a MBMS control channel (MCCH) change notification for LTE CA may be found on the carrier of the known serving communication cell that contains the MCCH.

The CN 104 also comprises, in this example, an evolved multicast broadcast multimedia server (MBMS) gateway (GW) 106 coupled to the BM-SC 107 and coupled to a mobility management entity (MME) 108 via an Sm interface. The MME 108 manages session control of MBMS bearers and is operably coupled to a home subscriber service (HSS) database 130 storing subscriber communication unit (UE) related information. The MBMS gateway 106 acts as a mobility anchor point and provides IP multicast distribution of the MBMS user plane data to the eNodeBs. The MBMS gateway 106 receives MBMS content via the Broadcast Multicast Service Centre (BM-SC) 107 from one or more content providers 109.

For control plane (CP) data, a MBMS co-ordination entity (MCE) 105 resides in the E-UTRAN between the MME 108 and the eNodeBs 110. Signal processing logic 101 within the MCE 105 manages the layer-2 configurations and the use of the radio resources for broadcast transmission. Thus, the MCE 105 is a RAN domain element and can be either a separate entity (as shown) or located at the eNodeB 110. For user plane (UP) data, the BM-SC 107 is directly coupled to the eNodeBs 110 via an M1 interface.

As illustrated, the CN 104 is operably connected to two eNodeBs 110, with their respective coverage zones or cells 185, 190 and a plurality of UEs 125 receiving transmissions from the CN 104 via the eNodeBs 110. In accordance with example embodiments of the present invention, a number of elements, for example at least one eNodeB 110 and at least one UE 125, have been adapted to support the concepts hereinafter described.

The main component of the RAN is an eNodeB (an evolved NodeB) 110, which performs many standard base station functions and is connected to the CN 104 via M1 interface and to the UEs 125 via an Uu interface. A wireless communication system will typically have a large number of such infrastructure elements where, for clarity purposes, only a limited number are shown in FIG. 1. The eNodeBs 110 control and manage the radio resource related functions for a plurality of wireless subscriber communication units/terminals (or user equipment (UE) 125 in UMTS™ nomenclature).

The eNodeBs 110 are operably coupled to the MBMS gateway 106 in the core network (CN) via an M1 interface and to a mobility management entity (MME) 108 in the core network (CN) via an M3 interface.

As illustrated, each eNodeB 110 comprises one or more wireless transceiver unit(s) 194 that is/are operably coupled to a signal processor module 196 and memory 192 for storing, inter alia, information relating to broadcast service identifiers, such as, in this example. MBMS radio network temporary identifiers (M-RNTIs). Example embodiments of the invention utilize the one or more wireless transceiver unit(s) 194, the signal processor module 196 is arranged to generate a message comprising a broadcast service identifier (e.g. M-RNTI), to be used to identify a control channel change (such as a MCCH change) of at least one serving cell accessible by the at least one wireless communication unit, such as UE 125. The one or more wireless transceiver unit(s) 194 communicate with the UEs 125 via a unicast channel 121 or broadcast multimedia content on a broadcast channel 122.

Each of the UEs comprise a transceiver unit 127 operably coupled to signal processing logic 129 (with one UE illustrated in such detail for clarity purposes only and to illustrate this UE as being able to receive both broadcast content on the broadcast channel 122 as well as hold unicast communications on the unicast channel 121. The system comprises many other UEs 125 and eNodeBs 110, which for clarity purposes are not shown.

Radio Network Temporary Identifier(s) (RNTIs) are used, in one instance, by eNB Physical Layer (PHY) for scrambling the cyclic redundancy check (CRC) bits in each of the downlink control information (DCI) code words to be transmitted on the physical downlink control channel (PDCCH). This scrambling process in PHY happens before modulation. An RNTI is also known for MBMS systems, referred to as M-RNTI. If the PDCCH is destined for a specific UE, a UE-specific RNTI is used for the scrambling operation and the DCI is located in the UE-specific search space. If the PDCCH is destined for multiple UEs, a common RNTI is used for the scrambling operation and the DCI is located in the common search space. An M-RNTI is an example of one such common RNTI that can be used for MBMS control channel (MCCH) change notification. At the UE, the DCI formats are de-scrambled with various RNTI to ascertain the nature of the DCI contents. For instance, if a DCI Format 1C is decoded, and after de-scrambling the CRC with the M-RNTI, the all zeros sequence is obtained, and, thus, the DCI Format 1C is assumed to contain an MCCH change notification.

In this manner, in one example, the CRC may be scrambled with the M-RNTI. The data may then be coded (and potentially rate-matched), after which it may be scrambled with a scrambling code. The scrambling code may use an identifier, amongst other things, in its construction. For the MCCH/MTCH this may use a common identifier whilst for the indicators using PDCCH this my use a cell-specific identifier.

Figure 2:
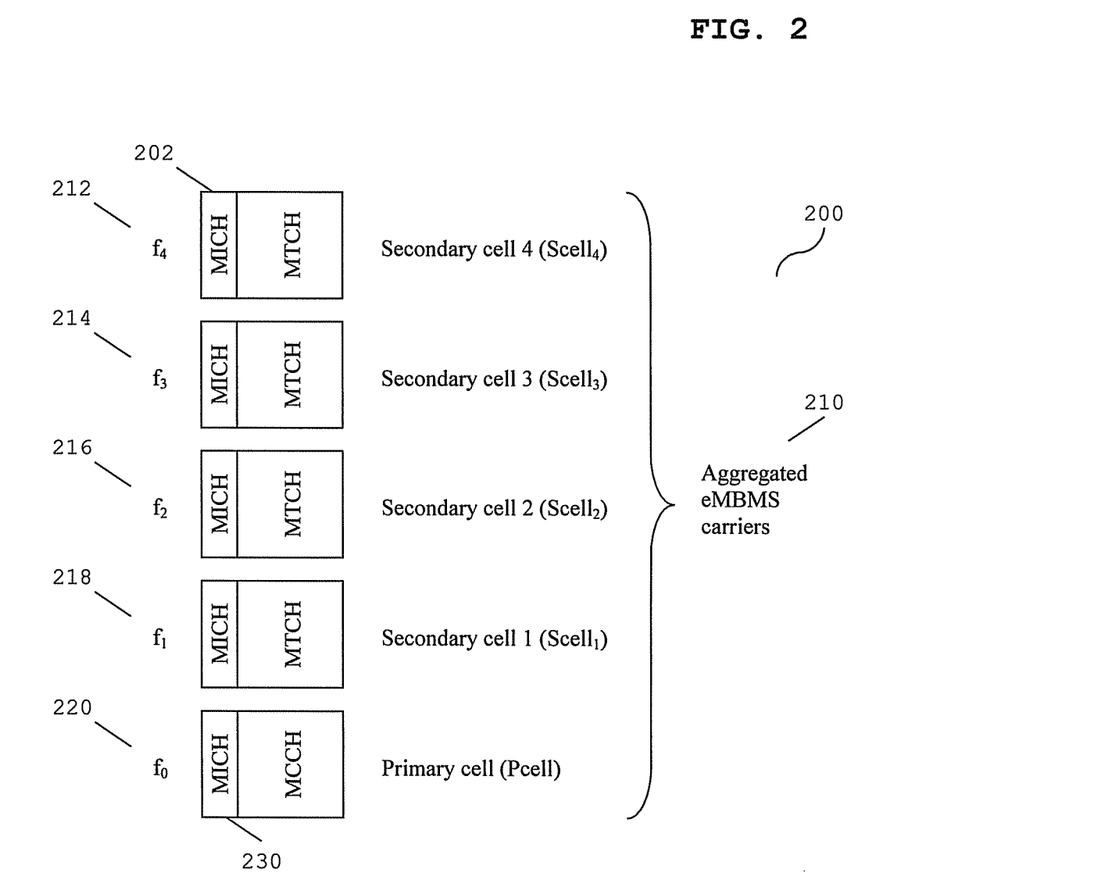
FIG. 2 illustrates an example of a MCCH change notification employed in a MICH on all CCs and MCCH on a single CC in accordance with some example embodiments of the invention.

Referring now to FIG. 2, an example of a MBMS Control Channel (MCCH) change notification channel structure 200 employing a MBMS Indicator Channel (MICH) 202 on all component carriers (CCs) $f_0$-$f_4$ 212-220 and the MCCH change notification on a single CC (e.g. the CC of a first serving communication cell, for example the primary cell of 220 in this example) is illustrated in accordance with some example embodiments of the invention. In this example, a plurality of eMBMS carriers (both primary and secondary) are aggregated 210 by the channel structure logic 103 of the BM-SC 107. In accordance with this example, the MICH 202 is physically added by the supporting eNodeB 110, and where, in some examples, the co-ordination of the MICH 202 is performed by the signal processing logic 101 of the MCE 105 or the channel structure logic 103 located within the BM-SC 107. The MICH 202 is physically added on each component carrier (CC) ($f_0$-$f_4$ 212-220 in this example) of the first serving communication cell and second serving communication cells (for example the secondary communication cells, Scell, in this example). In this manner, the MICH identifies across all supported CCs that a MBMS Control channel (MCCH) 230 change notification for LTE CA may be found on primary cell carrier of 220. Thus, the UE 125 then returns to the primary cell carrier of 220 in order to read the MCCH on the Pcell, or the MCCH change notification on the Pcell. In this latter case, with the UE 125 returning to read the MCCH change notification on the Pcell, the MCCH notification on the Pcell preferably indicates the MBSFN area that has an associated MCCH change. Thus, in the scenario that one or more services are self-contained on a carrier frequency, the UE's eMBMS receiver advantageously only needs to re-tune to the Pcell as and when the MICH indicates.

Thus, in this manner, a MICH indication 202 may be added by the supporting eNodeB 110, as co-ordinated by the signal processing logic 101 of the MCE 105 or the channel structure logic 103 located within the BM-SC 107, in the common search space of each CC 214-220 on its respective Scell, in contrast to the current LTE standard whereby a UE that is configured for CA is not required to read the common search space on the Scell.

In one example, a mechanism by which the MICH 202 can be realised on the Scell by the supporting eNodeB 110, as co-ordinated by the signal processing logic 101 of the MCE 105 or the channel structure logic 103 located within the BM-SC 107, is to transmit DCI Format 1C with the CRC scrambled, say, by the M-RNTI with all the bits in the 8-bit MCCH change notification payload set to zero. The current DCI Format 1C uses '8' bits for operation as defined in [TS 36.212]. In this manner, the scrambled transmit DCI Format 1C may explicitly indicate a new state where the UE needs to read the MCCH on the Pcell or the MCCH change notification on the Pcell or other known carrier where the MCCH is located.

In one example embodiment, an indicator to access the Pcell is sent out in a portion of the frame or subframe, on an indicator channel namely the MICH, using a single cell-specific ID (rather than the known common cell ID that is presently used for a MICH in UTRA) in order to instruct the UE 125 to access the Pcell CC (e.g. of 220 in FIG. 2) to obtain a MCCH change notification. Thus, UE 125 is configured or can be re-configured to support at least three different cell IDs, e.g. a common cell ID for data on the (at least one) Scell that it is receiving, a single cell-specific ID for control information on the MICH on the Scell that it is receiving in accordance with the aforementioned examples and either a common cell ID or a single cell-specific ID for accessing the Pcell in order to obtain the MCCH change notification in LTE Carrier Aggregation (CA). Furthermore, in this or other examples, different scrambling codes using single cell-specific IDs on the MICH may be used, even though the same broadcast data is being broadcast on all the cells using a common cell ID. In some example embodiments when applied to an LTE system, a cell-specific ID may be any number between '0' and '503' and a common cell ID may be any number between '0' and '255', and the scrambling operation may be performed using an exclusive-or (XOR) operation of the respective binary elements of the coded data and the scrambling sequence comprising the cell-specific or common cell ID.

In this manner, a common approach may be used by the supporting eNodeB 110, as co-ordinated by the signal processing logic 101 of the MCE 105 or the channel structure logic 103 located within the BM-SC 107, across all UEs operating on one or more secondary cells in order to identify where a control channel change (such as a MCCH change notification) may be found. The aforementioned examples enable signalling of MCCH change notifications on a single (primary cell) CC that is accessible and notified to all UEs operational on secondary cells; thus providing full flexibility for UE operation.

Figure 3:
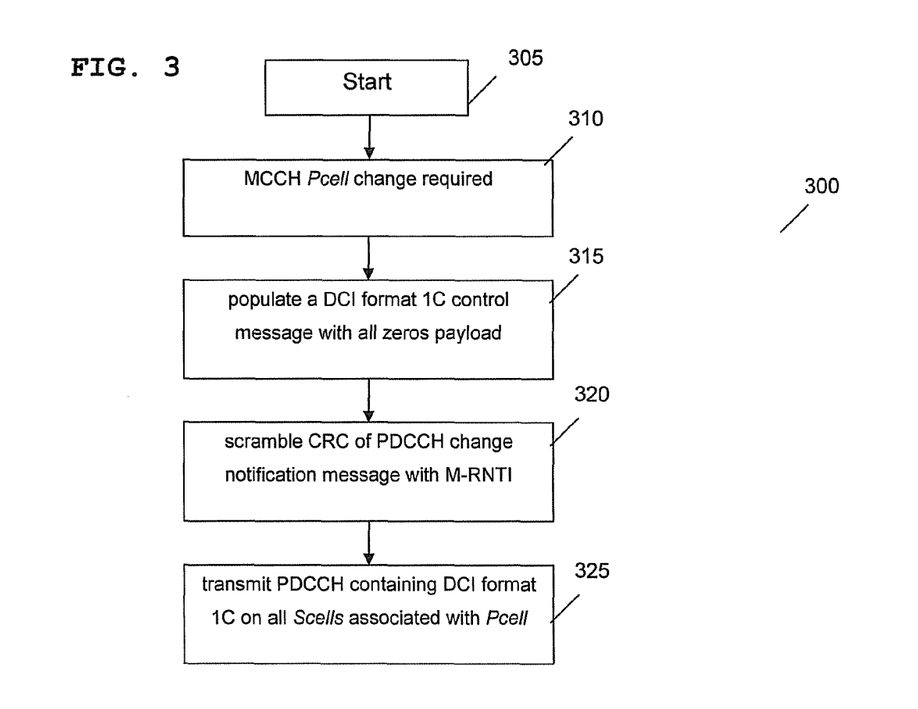
FIG. 3 illustrates an example of a flowchart employed at a BM-SC to support MCCH change notification for broadcast communications in accordance with some example embodiments of the invention.

Referring now to FIG. 3, an example of a flowchart 300 employed by the supporting eNodeB 110, as co-ordinated by the signal processing logic 101 of the MCE 105 or the channel structure logic 103 located within the BM-SC 107, is illustrated to support operation in accordance with example embodiments. The supporting eNodeB 110, as co-ordinated by the MCE 105 or the channel structure logic 103 located within the BM-SC 107, operations start at 305 and move on to 310 where the supporting eNodeB 110, as co-ordinated by the signal processing logic 101 of the MCE 105 or the channel structure logic 103 located within the BM-SC 107, determines that a MBMS control channel (MCCH) change is required. In one example, the supporting eNodeB 110, populates a DCI format 1C control message with a payload of all zeros in step 315, thereby informing recipient UEs that a MCCH change notification is to be sent on the primary or otherwise signalled cell. In one example, the eNodeB 110 may scramble the cyclic redundancy check (CRC) of the PDCCH change notification message with the M-RNTI, as shown in 320. The eNodeB 110 then transmits the PDCCH messages containing the DCI format 1C on all secondary cells associated with the primary cell, to the UEs. It is noted that the contents of each PDCCH message is the same, whereas the actual physical transmission may be different for each serving cell due to, in one instance, the use of cell-specific scrambling codes comprising the cell-specific IDs. In this manner, the PDCCH containing the null payload DCI Format 1C acts as an indicator channel, referred to in some examples as an MBMS indicator channel (MICH).

Figure 4:
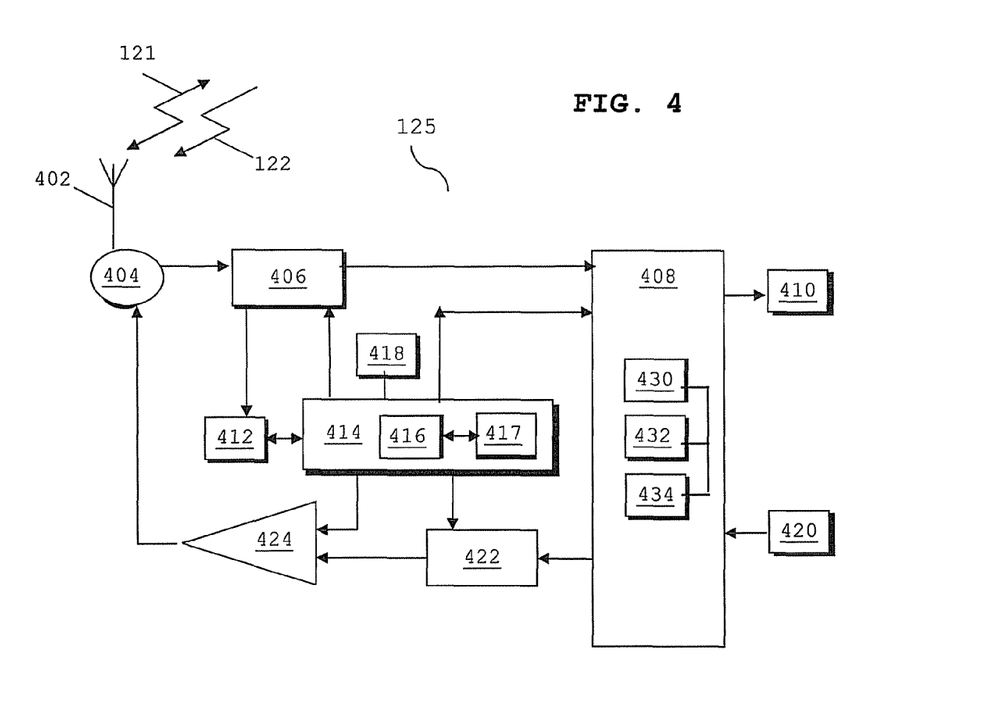
FIG. 4 illustrates an example of a wireless communication unit, such as an user equipment adapted in accordance with some example embodiments of the present invention.

Referring now to FIG. 4, a block diagram of a wireless communication unit, adapted in accordance with some example embodiments of the invention, is shown. In practice, purely for the purposes of explaining embodiments of the invention, the wireless communication unit is described in terms of a wireless subscriber communication unit such as a UE 125. The wireless communication unit 125 contains an antenna, an antenna array 402, or a plurality of antennae, coupled to antenna switch 404 that provides isolation between receive and transmit chains within the wireless communication unit 125. One or more receiver chains, as known in the art, include receiver front-end circuitry 406 (effectively providing reception, filtering and intermediate or base-band frequency conversion). The receiver front-end circuitry 406 is coupled to a signal processing module 408 (generally realised by a digital signal processor (DSP)). The one or more receiver chain(s) is/are operably configured to receive a broadcast data packet stream in one or more subframes over an eMBMS network and produce the broadcast data packet stream onto a suitable output device, such as a screen 410. A skilled artisan will appreciate that the level of integration of using receiver circuits or components may be, in some instances, implementation-dependent.

The receiver chain includes received signal quality indicator logic or circuitry 412, which in turn is coupled to a controller 414 that maintains overall subscriber unit control. The controller 414 or signal processing module 408 may receive signal quality information, for example in a form of bit error rate (BER), frame error rate (FER) or block error rate (BLER) data, from recovered broadcast content information. The controller 414 maintains overall operational control of the wireless communication unit 125. The controller 414 is also coupled to the receiver front-end circuitry 406 and the signal processing module 408. In some examples, the controller 414 is also coupled to a buffer module 417 and a memory device 416 that selectively stores operating regimes, such as decoding/encoding functions, synchronisation patterns, code sequences, and the like. A timer 418 is operably coupled to the controller 414 to control the timing of operations (transmission or reception of time-dependent signals) within the wireless communication unit 125.

As regards the transmit chain, this essentially includes an eMBMS input module 420, coupled in series through transmitter/modulation circuitry 422 and a power amplifier 424 to the antenna, antenna array 402, or plurality of antennae. The transmitter/modulation circuitry 422 and the power amplifier 424 are operationally responsive to the controller 414 and operably configured to enter into unicast communication to the UE's supporting eNodeB 110.

The signal processor module 408 in the transmit chain may be implemented as distinct from the signal processor in the receive chain. Alternatively, a single processor may be used to implement a processing of both transmit and receive signals, as shown in FIG. 4. Clearly, the various components within the wireless communication unit 125 can be realized in discrete or integrated component form, with an ultimate structure therefore being an application-specific or design selection.

In one example, the signal processor module 408 of the wireless communication unit (UE) 125 receives/monitors the MBMS service on one or more secondary communication cells. The signal processor module 408 of the wireless communication unit (UE) 125 also performs blind decoding of a common search space, which in the above examples is to identify the MICH, to extract any MCCH change notification indicator, for example in DCI format 1C. Dependent upon the blind decoding of the PDCCH, the signal processor module 408 of the wireless communication unit (UE) 125 determines whether or not a MBMS control channel (MCCH) change has been implemented and re-tunes from the operational (one or more) secondary channels to the primary channel to decode the MCCH change notification.

Figure 5:
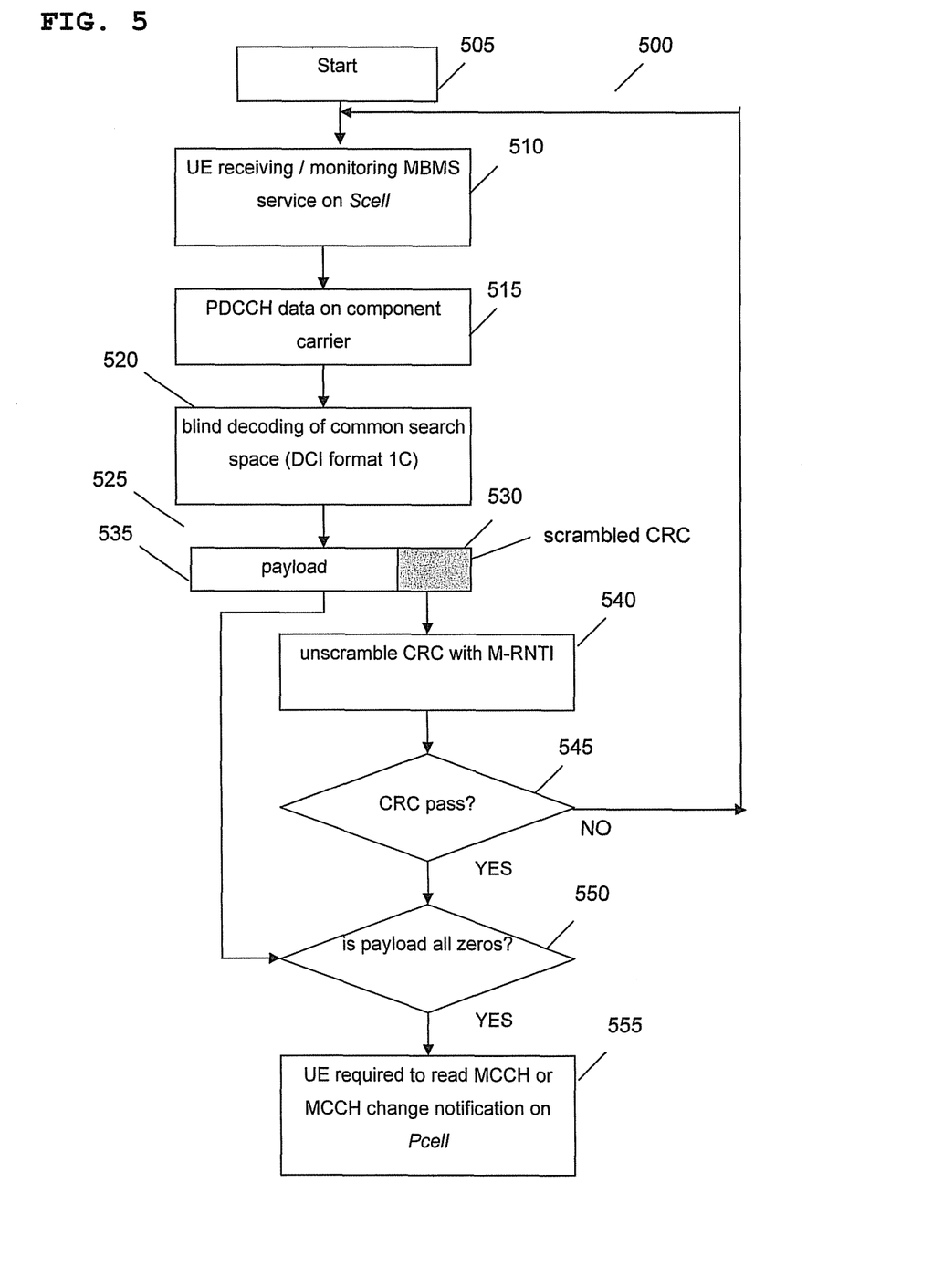
FIG. 5 illustrates an example of a flowchart employed at an user equipment to support cross carrier scheduling for broadcast communications in accordance with some example embodiments of the invention.

Referring now to FIG. 5, an example of a flowchart 500 to support a UE operation in accordance with the third example embodiment is illustrated. The UE operations start at step 505 and move on to step 510 where the UE receives/monitors the MBMS service on one or more secondary cells. The UE receives physical downlink control channel (PDCCH) data on a component carrier (CC) associated with the one or more secondary cells, as shown in step 515. The UE's blind decoding produces a received data packet(s) 520 comprising a data payload 525 and a CRC value 530 that can be unscrambled. The UE then unscrambles the cyclic redundancy check (CRC) of the PDCCH data with the broadcast service identifier (e.g. M-RNTI), as shown in step 540. The UE then determines, in accordance with the first example embodiment, whether (or not) the unscrambled CRC contains all zeros, as shown in step 545.

If the UE determines that the CRC does not pass, in step 545, the UE returns to receiving or monitoring the MBMS service, as shown in step 510. If the UE determines that the CRC does pass, in step 545, it checks the contents of the DCI payload. If this payload is all zeros, as shown in step 550, the UE determines that an MCCH change or MCCH change notification is to be transmitted on the primary (or otherwise signaled) cell. The PDCCH on a serving cell with a CRC scrambled with the M-RNTI and a DCI payload of all zeros is referred to in some examples as an MBMS indicator channel (MICH).

Figure 6:
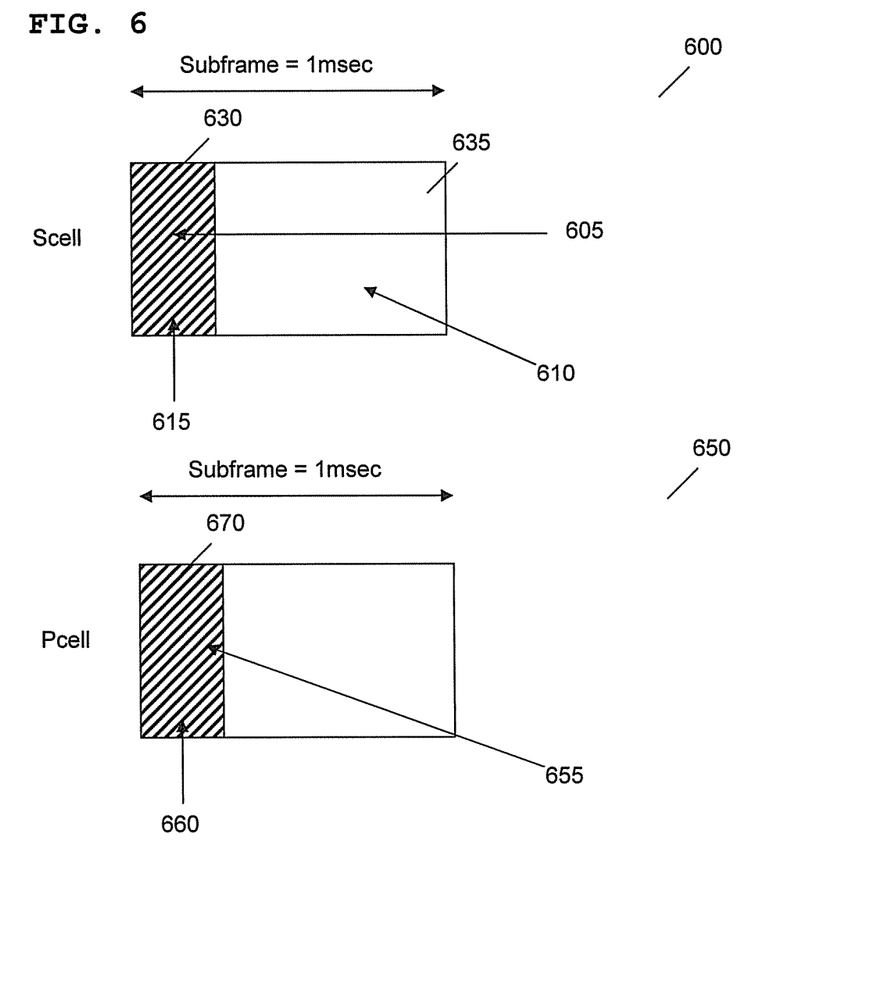
FIG. 6 illustrates an example of a scrambling operation and an example in using identifiers in accordance with some example embodiments of the invention.

FIG. 6 illustrates an example of a scrambling operation and an example in using identifiers in accordance with some example embodiments of the invention. A subframe of 1 msec. is illustrated for an Scell 600, with an MCCH change notification indicator (e.g. a MICH in some examples) 605 carried in a first example portion 630 of the subframe. In addition, control symbols per region 615 using cell-specific identifier as part of the data scrambling may also be carried in the first example portion 630 of the subframe. Broadcast data 610 using a common identifier as part of the data scrambling is carried in a second example portion 635 of the subframe.

A subframe of 1 msec. is also illustrated for a Pcell 650, with an MCCH change notification indicator (e.g. a MICH in some examples) 655 is again carried in a first example portion 670 of the subframe. In addition, control symbols per region 660 using a different cell-specific identifier as part of the data scrambling may also be carried in the first example portion 670 of the subframe.

Figure 7:
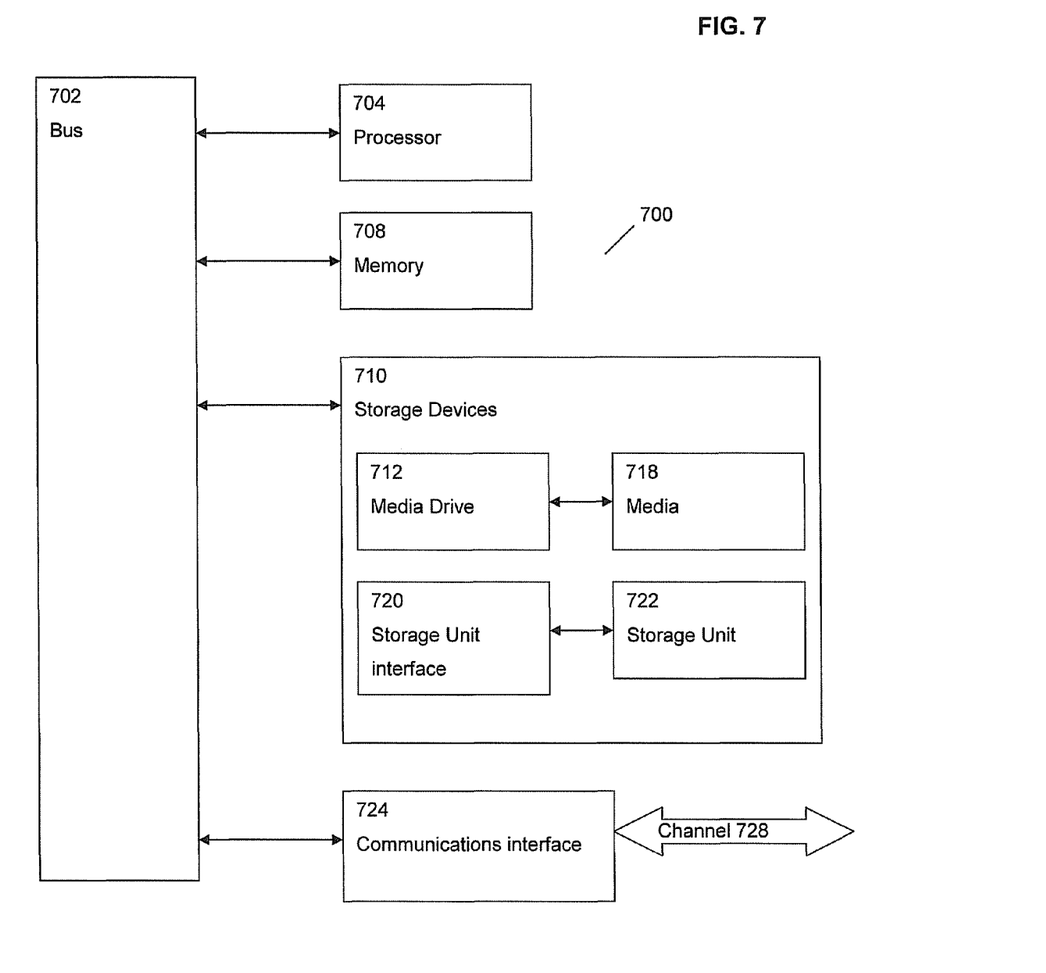
FIG. 7 illustrates a typical computing system that may be employed to implement signal processing functionality in embodiments of the invention.

Referring now to FIG. 7, there is illustrated atypical computing system 700 that may be employed to implement signal processing functionality in embodiments of the invention. Computing systems of this type may be used in access points and wireless communication units. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the invention as described herein.

In one example, a tangible non-transitory computer program product comprises executable program code for supporting control channel change notification for at least one wireless communication unit that is capable of operating on both a first serving communication cell and has been configured with access to at least one second serving communication cell in a wireless broadcast communication system. The executable program code operable for, when executed at a network element supporting communication with the at least one wireless communication unit via the at least one second serving communication cell; generating a message comprising an indication that a control channel change notification will be sent in the at least one first serving communication cell; transmitting the message to the at least one wireless communication unit operational in the at least one second serving communication cell; and transmitting the control channel change notification in the first serving communication cell.

In one example, a tangible non-transitory computer program product comprises executable program code for supporting control channel change notification for a wireless communication unit that is capable of operating on both a first serving communication cell and has been configured with access to at least one second serving communication cell in a wireless broadcast communication system. The executable program code may be operable for, when executed at the wireless communication unit: receiving communication via the at least one second serving communication cell; receiving and decoding a message via the at least one second serving communication cell wherein the message comprises an indication that a control channel change notification is to be sent in the at least one first serving communication cell; and receiving the control channel change notification in the first serving communication cell.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 408 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

The invention claimed is:

1. A method for supporting control channel change notification for at least one wireless communication unit that is capable of operating on a first serving communication carrier and has been configured with access to at least one second serving communication carrier in a wireless broadcast communication system, the method comprising, at a network element:
   supporting communication with the at least one wireless communication unit via the at least one second serving communication carrier;
   generating a message comprising an indication that a control channel change notification will be sent in the at least one first serving communication carrier;
   transmitting the message to the at least one wireless communication unit operational in the at least one second serving communication carrier; and
   transmitting the control channel change notification in the first serving communication carrier.

2. The method of claim 1, wherein the supporting communication with the at least one wireless communication unit via the at least one second serving communication carrier comprises supporting communication with the at least one wireless communication unit via only the at least one second serving communication carrier.

3. The method of claim 1, wherein the transmitting the message to the at least one wireless communication unit operational in the at least one second serving communication carrier comprises transmitting the message in a common search space across a plurality of second serving communication carriers via a base station.

4. The method of claim 1, wherein the generating a message comprising the indication that a control channel change notification will be sent in the at least one first serving communication carrier comprises setting a payload of data to substantially all zeros.

5. The method of claim 4, wherein the generating a message comprising the indication comprises setting a payload of data to substantially all zeros and first scrambling a cyclic redundancy check (CRC) of the payload with a broadcast identifier.

6. The method of claim 5, wherein the message is generated in a DCI format 1C message and the method further comprises first scrambling the DCI format 1C message CRC with the broadcast service identifier.

7. The method of claim 6, wherein the first scrambling the DCI format 1C message CRC with the broadcast service identifier comprises first scrambling a coded DCI format 1C message CRC with a multicast broadcast multimedia service (MBMS) radio network temporary identifier (M-RNTI).

8. The method of claim 4, wherein the generating a message comprising the indication comprises first scrambling a coded DCI format 1C message with a scrambling code comprising a carrier-specific or common carrier identifier.

9. The method of claim 1, wherein the generating a message comprising the indication that a control channel change notification will be sent in the at least one first serving communication carrier comprises allocating the indication to a portion of a frame or a subframe dedicated to at least one control channel or dedicated to at least one indicator channel.

10. The method of claim 9, wherein the allocating the indication to a portion of a frame or a subframe dedicated to at least one control channel or dedicated to at least one indicator channel comprises allocating a carrier-specific identifier to second scramble the indicator that indicates that the control channel change notification will be sent in the at least one first serving communication carrier.

11. The method of claim 1, wherein the transmitting the message in the at least one second serving communication carrier comprises transmitting the message in each of the at least one second serving communication carrier and the at least one first serving communication carrier.

12. The method of claim 1, wherein the transmitting the control channel change notification in the first serving communication carrier comprises transmitting the control channel change notification on a single carrier frequency in the first serving communication carrier.

13. The method of claim 1, wherein the message identifies a control channel change of a multi cast broadcast multimedia service (MBMS) Control Channel (MCCH) associated with the at least one wireless communication unit.

14. The method of claim 1, wherein the network element comprises at least one from a group consisting of: a broadcast server, channel structure logic located within a broadcast server a multicast broadcast multimedia service (MBMS) co-ordination entity (MCE) or a base station.

15. The method of claim 1, wherein the wireless broadcast communication system supports a long term evolved (LTE) multicast broadcast multimedia service.

16. A non-transitory computer readable medium comprising computer executable program code for supporting control channel change notification for at least one wireless communication unit that is capable of operating on both a first serving communication carrier and has been configured with access to at least one second serving communication carrier in a wireless broadcast communication system, the executable program code operable for, when executed at a network element, performing the method of claim 1.

17. The method of claim 16, wherein the receiving the control channel change notification in the first serving communication carrier comprises receiving the control channel change notification on a single carrier frequency in the first serving communication carrier.

18. A method for supporting control channel change notification for a wireless communication unit that is capable of operating on a first serving communication carrier and has been configured with access to at least one second serving communication carrier in a wireless broadcast communication system, the method comprising, at the wireless communication unit:
  receiving communication via the at least one second serving communication carrier;
  receiving and decoding a message via the at least one second serving communication carrier wherein the message comprises an indication that a control channel change notification is to be sent in the at least one first serving communication carrier; and
  receiving the control channel change notification in the first serving communication carrier.

19. The method of claim 18, wherein the receiving communication via the at least one second serving communication carrier comprises receiving communication via only the at least one second serving communication carrier.

20. The method of claim 18, wherein the receiving communication via the at least one second serving communication carrier comprises receiving the message in a common search space across a plurality of second serving communication carriers.

21. The method of claim 18, wherein the receiving and decoding the message comprises receiving and de-scrambling a cyclic redundancy check (CRC) of a payload with a broadcast identifier.

22. The method of claim 18, wherein the message is generated in a DCI format 1C message and wherein receiving and decoding the message comprises receiving and first de-scrambling the DCI format 1C message CRC with a broadcast service identifier.

23. The method of claim 22, wherein the first de-scrambling the DCI format 1C message CRC with a broadcast service identifier comprises first de-scrambling the DCI format 1C message CRC with a multicast broadcast multimedia service (MBMS) radio network temporary identifier (M-RNTI).

24. The method of claim 18, wherein the receiving and decoding the message comprises receiving and second de-scrambling coded data with a scrambling code comprising a carrier-specific identifier or a common carrier identifier.

25. The method of claim 18, wherein the receiving and decoding the message comprises receiving and decoding the indication from a portion of a frame or a subframe dedicated to at least one control channel or dedicated to at least one indicator channel.

26. The method of claim 25, wherein the receiving and decoding the indication from a portion of a frame or a subframe dedicated to at least one control channel or dedicated to at least one indicator channel comprises second de-scrambling coded data with a scrambling code comprising a carrier-specific identifier to identify that the control channel change notification will be sent in the at least one first serving communication carrier.

27. The method of claim 18, further comprising receiving and decoding at least three identifiers comprising:
  a first common carrier identifier for broadcast data on the at least one second serving communication carrier that the wireless communication unit is receiving,
  a first single carrier-specific identifier for control information on an indicator channel on the at least one second serving communication carrier that the wireless communication unit is receiving; and
  either a second common carrier identifier or a second single carrier-specific identifier for accessing the at least one first serving communication carrier in order to obtain the either the control channel or the control channel change notification.

28. The method of claim 18, wherein the receiving the message in the at least one second serving communication carrier comprises receiving the message in each of the at least one second serving communication carriers and the at least one first serving communication carrier.

29. The method of claim 18, wherein the receiving the message comprises receiving a DCI format 1C message that identifies a control channel change of a multicast broadcast multimedia service (MBMS) Control Channel (MCCH) accessible by the at least one wireless communication unit.

30. The method of claim 18, wherein the wireless communication unit is arranged to receive a long term evolved (LTE) multicast broadcast multimedia service.

* * * * *